(12) United States Patent
Schenning (10) Patent No.: US 9,611,103 B2
(45) Date of Patent: Apr. 4, 2017

(54) METHOD AND DEVICE FOR MOVING A STACKABLE CARGO UNIT

(71) Applicant: Copal Holding B.V., 's-Heerenberg (NL)

(72) Inventor: Jozef Gerhardus Henricus Maria Schenning, 's-Heerenberg (NL)

(73) Assignee: Copal Holding, B.V., 's-Heerenberg (NL)

( * ) Notice: Subject to any disclaimer, the term of this patent is extended or adjusted under 35 U.S.C. 154(b) by 0 days.

(21) Appl. No.: 15/028,605

(22) PCT Filed: Oct. 10, 2014

(86) PCT No.: PCT/NL2014/050708
§ 371 (c)(1),
(2) Date: Apr. 11, 2016

(87) PCT Pub. No.: WO2015/053633
PCT Pub. Date: Apr. 16, 2015

(65) Prior Publication Data
US 2016/0264364 A1    Sep. 15, 2016

(30) Foreign Application Priority Data
Oct. 11, 2013   (NL) .................................... 2011602

(51) Int. Cl.
*B65G 47/90* (2006.01)
*B65G 59/02* (2006.01)
*B25J 15/00* (2006.01)

(52) U.S. Cl.
CPC .......... *B65G 47/90* (2013.01); *B25J 15/0071* (2013.01); *B65G 59/02* (2013.01); *B65G 2201/0238* (2013.01)

(58) Field of Classification Search
CPC ...... B65G 47/90; B65G 47/907; B65G 59/02; B65G 2201/0238; A01D 87/003;
(Continued)

(56) References Cited

U.S. PATENT DOCUMENTS 1,295,163 A    2/1919   Henricks
2,552,228 A *  5/1951   Spann ................. A01D 87/003
                                                         294/109

(Continued)

FOREIGN PATENT DOCUMENTS

DE    39 35 513 A1    5/1991
GB    2 011 346    *  7/1979
(Continued)

*Primary Examiner* — Dean Kramer
(74) *Attorney, Agent, or Firm* — Shewchuk IP Services, LLC; Jeffrey D. Shewchuk (57) ABSTRACT

A method for moving a stackable cargo unit (199) such as a bag (199) from a first location to a second location comprises the use of a device (140) having a head (250) comprising a first section and a second section, the first section and the second section hingedly connected and each section provided with needles for penetrating the stackable cargo unit (199). The needle is capable of moving along a trajectory so as to penetrate the stackable cargo unit (199). Then the stackable cargo unit (199) can be moved and subsequently released by moving the needle in the reverse direction. The invention also relates to a device (140) suitable for performing the method and an apparatus (100) comprising said device (140).

15 Claims, 5 Drawing Sheets

(58) Field of Classification Search
CPC .... A01D 87/126; B65H 2405/60; B65H 3/22; B25J 15/0071
USPC .......................................... 294/61; 271/18.3
See application file for complete search history.

(56) References Cited

U.S. PATENT DOCUMENTS

| | | | |
|---|---|---|---|
| 3,112,136 A | | 11/1963 | Hammond |
| 3,319,813 A | * | 5/1967 | Beyea .................... A01D 87/00 294/107 |
| 4,805,949 A | | 2/1989 | Conway |
| 5,161,844 A | * | 11/1992 | Zimmer .................. B65H 3/22 271/18.3 |
| 5,829,940 A | * | 11/1998 | Mahaney ............. A01D 87/126 294/105 |

FOREIGN PATENT DOCUMENTS

| | | |
|---|---|---|
| WO | 2006/121329 A1 | 11/2006 |
| WO | 2010/092603 A2 | 8/2010 |
| WO | 2014/088416 A1 | 6/2014 |

\* cited by examiner

Fig. 4B

METHOD AND DEVICE FOR MOVING A STACKABLE CARGO UNIT

A method for moving a stackable cargo unit from a first location to a second location, a device and an apparatus The present invention relates to a method for moving a stackable cargo unit from a first location to a second location using a device for picking up and holding the stackable cargo unit, said device comprising a head, the head comprising an actuator;
a base for being placed over the stackable cargo unit; and
a piercing element, wherein said piercing element comprises
a body for holding the stackable cargo unit, the body connected to the actuator; and
a free end for piercing the stackable cargo unit, the free end connected to the body and capable of being moved by said actuator along a trajectory relative to the base, said trajectory comprising a first position and a second position, wherein
in the first position the free end of the piercing element faces downward, with a vector that defines the orientation of the free end having a first horizontal component smaller than a first vertical component of said first vector; and
in the second position the vector that defines the orientation of the free end has a vertical component that is smaller than the horizontal component of said vector, the free end in said second position being lower relative to the base than the free end in the first position;

and wherein the method comprising the steps of
i) picking up the stackable cargo unit at its top surface with the device at the first location;
ii) moving the device from said first location towards the second location while holding the stackable cargo unit with the device; and
iii) releasing the stackable cargo unit from the device.

Moving a stackable cargo unit from a first location to a second location by using a device for picking up and holding the stackable cargo unit is known in the art. For example, EP1885636 discloses a method wherein a device comprising an array with suction cups for picking up and holding a stackable cargo unit (for instance a box) is used. Its functionality relies on the stackable cargo unit to be transported. That is, the vacuum cups work when picking up and holding a box, the apparatus can not be used or not be reliably used when the stackable cargo unit is for instance a bale of certain materials such as cotton or fabrics, or a flexible sack in particular if the flexible sack is made of a porous material because the vacuum cups may not achieve vacuum when they are placed on top of said bale or sack. Also, even if vacuum is achieved with a flexible sack that is not made of a porous material, due to the downward displacement of the product contained therein when said sack is picked up, the wall of the flexible sack is pulled away from the vacuum cup, which may cause loss of vacuum during the picking-up or the movement of said sack and causing thus dropping of said sack. To overcome this problem, U.S. Pat. No. 3,112,136 discloses a method according to the preamble wherein a fork unit is used. The fork unit comprises a set of hooks as piercing elements hydraulically actuated by a cylinder.

The present invention aims to provide a method according to the preamble by which a non-rigid stackable cargo unit, which in the present application means stackable cargo units that do not have a rigid wall, such as a bale, a flexible bag or sack, can be moved from the first location to the second location in a more reliable way.

To this end, a method according to the preamble is characterized in that the head comprises a first section and a second section, the first section and the second section hingedly connected and each section comprising
a piercing element, and
an actuator for actuating said piercing element;
and wherein
picking up the stackable cargo unit with the device comprises the steps of i) placing the base of said device over the surface of the stackable cargo unit and ii) moving the free end of the piercing element by the actuator along the trajectory in a direction from the first position towards the second position;
holding the stackable cargo unit is achieved by having the free end in a position away from the first position; and
releasing said stackable cargo unit from the device comprises the step of moving said free end by the actuator along the trajectory in a direction from the second position towards the first position.

Thus, a more reliable method is provided for moving a stackable cargo unit from the first location to the second location because the head can adapt to the shape of the stackable cargo unit, because the distal ends of the head sections can move upward upon contact with the stackable cargo unit. For the sake of clarity, the device for picking up and holding the stackable cargo unit according to the present invention will be referred from here as the "device". When the base of the device is placed over the stackable cargo unit, it does not have to touch the stackable cargo unit, but when it doesn't it must be close enough to allow the piercing element to pierce it when the free end of the piercing element moves along the trajectory towards the second position thanks to the actuator. The free end of the piercing element pierces therefore the surface of said stackable cargo unit at its top. By this movement of the free end, the body also penetrates into the stackable cargo unit, the piercing element being thus capable of holding said stackable cargo unit at its top surface when the free end is at least in the second position. Lastly, the stackable cargo unit is released by reverting said free end towards the first position.

In an important embodiment, the method is used in a cargo space, such as a maritime container, in order to load or unload said cargo space.

According to a favourable embodiment, the head of the device is connected to a movable arm of an apparatus. This allows the step of moving the stackable cargo unit from the first location towards the second location to comprise the step of moving the movable arm of said apparatus.

Thus, moving the stackable cargo unit from the first location to the second location can therefore be done by personnel with little physical stress. In general, the movable arm is connected to a mobile frame to take said movable arm and the device to different places. For example, the frame may comprise wheels, so the device may be brought further into the cargo space or back as said cargo space is being unloaded or loaded respectively.

The present invention also relates to a device for picking up and holding a stackable cargo unit, wherein the device comprises a head, the head comprising
an actuator;
a base for being placed over the stackable cargo unit; and
a piercing element, wherein said piercing element comprises
a body for holding the stackable cargo unit, the body connected to the actuator; and a free end for piercing the stackable cargo unit, the free end connected to the body and capable of being moved by said actuator along a trajectory relative to the base, said trajectory comprising a first position and a second position, wherein
  in the first position the free end of the piercing element faces downward, with a vector that defines the orientation of the free end having a first horizontal component smaller than a first vertical component of said first vector; and
  in the second position the vector that defines the orientation of the free end has a vertical component that is smaller than the horizontal component of said vector, the free end in said second position being lower relative to the base than the free end in the first position;
wherein the head comprises a first section and a second section, the first section and the second section hingedly connected and each section comprising
  a piercing element, and
  an actuator for actuating said piercing element.

Thus, the reliability of the device is improved because the head can adapt to the shape of the stackable cargo unit, because the distal ends of the head sections can move upward upon contact with the stackable cargo unit. In general, the side-sections of the head can swing over at least 10° with respect to each other, preferably at least 20° and more preferably at least 30°. Thus, the head provides a receiving face facing a stackable cargo unit to be picked up, and once a hinged section contacts said stackable cargo unit, the angle with respect to the other section may change so as to allow that other section to contact the stackable cargo unit as well, in effect adapting the head to the stackable cargo unit.

Such a device can be used for moving a stackable cargo unit in a more reliable way. In general the head of the device will comprise a connecting element capable of connecting the device to an apparatus, for example to a distal end of a movable arm or to a lifting device (e.g. a forklift truck). The piercing element is for example a needle with a curved or bent shape, which makes possible that only one piercing element suffices for picking up and holding the stackable cargo unit. The free end and the body of said piercing element can be easily designed or chosen by the man skilled in the art depending on factors such as the size, shape and material of the stackable cargo unit and/or the wall thereof. Also, the device may comprise more than one piercing element to improve the reliability of the device.

According to a favourable embodiment, the piercing element is rotatable about an axis that is transverse to the vertical when the device picks up and holds the stackable cargo unit.

Thus, the height of the base can be relatively low, improving the usefulness of the apparatus in cases where there is a ceiling. For instance, the apparatus may be used in a reduced cargo space, such as a maritime container, where there is little room between the top of said stackable cargo unit and the top of the cargo space. The stackable cargo unit can be pierced at its top by the free end and the body can move into thanks to the rotatory movement provided by the actuator.

According to a favourable embodiment, the free end is capable of being moved along the trajectory relative to the base to a third position, wherein the second position is between the first position and the third position, and in said third position the free end of the piercing element is pointing upwards when the device picks up and holds the stackable cargo unit.

Thus the risk of undesired releasing of said stackable cargo unit is reduced. The free end may end up in the base, effectively locking the stackable cargo unit.

According to a favourable embodiment, in the third position, the vector that defines the orientation of the free end has a vertical component that is larger than the horizontal component.

Thus the performance of the piercing element is improved, since when the free end is in the third position, the risk of swinging of the stackable cargo unit is reduced.

According to an especially preferred embodiment, the piercing element is a first piercing element that comprises a first free end and the device comprises a second piercing element that comprises a second free end, both the first piercing element and the second piercing element being operably connected to the same actuator.

This saves the cost and the control of separate actuators for both piercing elements. The actuator is a floating actuator. That is, both its ends are connected to a body of a piercing element and are capable of exerting a force for moving the piercing elements. The actuator may be a linear motor or pneumatic cylinder (e.g. with double-action piston), mounted to moving freely. With one end being connected to the first piercing element and the other end being connected to the other piercing element, both piercing elements are operated by the same actuator. Alternatively, the actuator comprises two oppositely movable pistons, one at each end of a cylinder that may be mounted fixed with respect to the base.

Furthermore, since the stackable cargo unit can be held at two different areas, the force that is applied at each area due to the weight of said stackable cargo unit is reduced. Thus, the risk of tear of the stackable cargo unit at those areas due to its weight is also reduced. The distance and/or position of the first piercing element with respect to the second piercing element can be chosen by the man skilled in the art according to factors such as the weight or size of the stackable cargo unit.

According to a favourable embodiment, in the second position, the direction of the horizontal component of the first free end is opposite to the direction of the horizontal component of the second free end.

Thus, the security during the picking up process and transportation is improved when both devices pick up and hold the stackable cargo unit. It is preferred that the free ends of the devices point away from each other for even more improved reliability.

According to a favourable embodiment, the base comprises a first stop for preventing the first free end from being moved beyond the third position of the first piercing element and a second stop for preventing the second free end from being moved beyond the third position of the second piercing element.

Thus, this improves the reliability in the apparatus during the picking of the stackable cargo unit. If the first and second piercing element encounter different resistances when penetrating the stackable cargo unit, the free end of that piercing element will move quicker and/or further. By providing a stop, once the piercing element is stopped, all force provided by the actuator will be exerted for moving the other piercing element. Thus it is ensured that it penetrates the stackable cargo unit satisfactorily deep.

According to an especially preferred embodiment, the piercing element is a hook.

The term hook comprises any curved-shaped body with a free end as piercing element at one extreme capable of piercing a stackable cargo unit. It is, for example, a hemicircular needle. It has preferably a sharp tip to facilitate penetrating the stackable cargo unit.

According to a favourable embodiment, the device comprises
a plate, said plate comprising
  a first outer face; and
  a second outer face i) opposite to the first outer face, and ii) facing away said first outer face;
and
  a holding system for holding at least part of the plate, said holding system comprising a cage comprising
    a first inner face; and
    a second inner face that i) is opposite to the first inner face, and ii) faces said first inner face;
wherein the cage and the plate can move relative to each other using
  i) a pin, and
  ii) an opening for the pin;
with the at least part of the plate between the first inner face and the second inner face of the cage, such that the first outer face of the plate faces said first inner face, and the second outer face of the plate faces said second inner face.
Thus, the device is capable of being in
  a first state when the head is supported by the stackable cargo unit where the relative movement of the plate and the cage is stopped by contact between the first inner face and the first outer face; and
  a second state when the stackable cargo unit is lifted by the device, where the relative movement of the plate and the cage is stopped by contact between the second inner face and the second outer face.

In this way, the device can be easily positioned on top of the stackable cargo unit with little accuracy, since the head can moved along the vertical when placed on top of the stackable cargo unit. The holding system is connected to the head in such a way that said holding system does not prevent the base and the piercing element from being easily placed on top of the stackable cargo unit. The holding system may be connected to the base or to the head of the device depending on the design of said device. For instance, if the device comprises only one base, the holding system may be connected to said base such that the plate can be slidably mounted between the first inner face and the second inner face of the cage in different ways by a guided movement of the pin through the opening. For example, the pin may be connected to both the plate and the base of the device and the cage comprises the opening at the second inner face. In a different embodiment, the plate may comprise the opening and the cage is connected to the base of the device, said cage also comprising the pin. In general, the movement of the plate within the cage can be stopped by the first inner surface and the second inner surface respectively. It is preferred that the holding system further comprises a connecting element for connecting the device to an apparatus such as a movable arm or a lifting device. When the plate comprises the connecting element the cage is connected to the base of the device, and vice-versa.

According to a favourable embodiment, the cage is connected to the base of the head, said cage comprising the pin, and the plate comprises the opening for the pin to act as a guide.

Thus a more robust device is provided since the pin does not have to deal with the weight of the device and the stackable cargo unit. The pin may be connected to the first inner face, the second inner face or both of them.

According to a favourable embodiment, the opening is oversized with respect to the pin.

Thus the performance of the device of the apparatus is improved. The head can tilt to accommodate to the shape of the stackable cargo unit when the plate is in the first state, the piercing element having thus a better chance for piercing said stackable cargo unit. In the present application, the term oversized means that the opening allows the plate to change its tilting orientation with respect to the first inner face and/or the second inner face of the cage, which for example can also be achieved even if the wall that defines the opening is covered with an resilient material, said wall touching the pin. The extent of the tilting depends on factors such as the distance that the plate can slide between the first inner face and the second inner face, the distance between the exterior wall of the pin and the wall defining the opening, etc., and is preferably at least 5° from the vertical.

According to a favourable embodiment, the plate comprises a protruding top plate section, the protruding top plate section comprising the first outer face facing the first inner face of the cage.

Thus, the head of the device can tilt more easily by hinging about a point of the circumferential edge of the protruding top plate section. The protruding plate section for example has a polygonal shape, e.g. rectangular or octagonal. It is preferred that the shape is polygonal (with preferably 8 or more sides), so each side of the polygonal edge defines a different pre-defined tilting orientation.

According to a favourable embodiment, the protruding top plate section has a round shape.

Thus, the number of pre-defined tilting orientations is increased. Here the round shape is preferably circular.

According to a favourable embodiment, the head comprises a first section and a second section, the first section and the second section hingedly connected to the cage and each section comprising
  a piercing element,
  an actuator for actuating said piercing element, and
  a lever arm capable of exerting an upward force on the plate.

This allows the head to be leveled if a stackable cargo unit is held by the head in a way that is off-center.

Finally, the present invention relates to an apparatus for moving a stackable cargo unit from a first location to a second location wherein the apparatus comprises a movable arm comprising a distal end, said distal end connected to a device for picking up and holding the stackable cargo unit.

Thus, a stackable cargo unit can be picked up at its top side in a reliable way and transported from a first location to a second location by the apparatus, which reduces the stress for the personnel and/or speeds up the process of moving the stackable cargo units. In general, the movable arm is connected to a mobile frame to take said movable arm and the device to different places. For example, the frame may comprise wheels.

According to a favourable embodiment, the apparatus further comprises a parallelogram-shaped construction comprising two parallel legs, each leg having a first end rotatably connected to the head of the device and a second end rotatably connected to the distal end of the arm, the apparatus comprising a further actuator for changing the height of the base.

In this way, the base of the piercing element can be easily placed on top of the stackable cargo unit. The base of the head, after being placed above the stackable cargo unit, can descend without changing its orientation relative to the arm by the actuator. Consequently, with such a construction the time necessary for picking up a stackable cargo unit is reduced.

According to a favourable embodiment, the apparatus is provided with a conveyor track having
a conveyor distal end relatively far from the arm, and
a conveyor proximal end relatively close to the arm.

Such an apparatus can be used to load and/or unload stackable cargo units from a cargo space, such as a maritime container. The stackable cargo units can be placed onto the conveyor track, e.g. a conveyor belt, by the head, said stackable cargo units being transported from the proximal end of the conveyor track, placed at the entrance or inside the interior of the cargo space, to the distal end.

The present invention will now be illustrated with reference to the drawing where.

Figure 1:
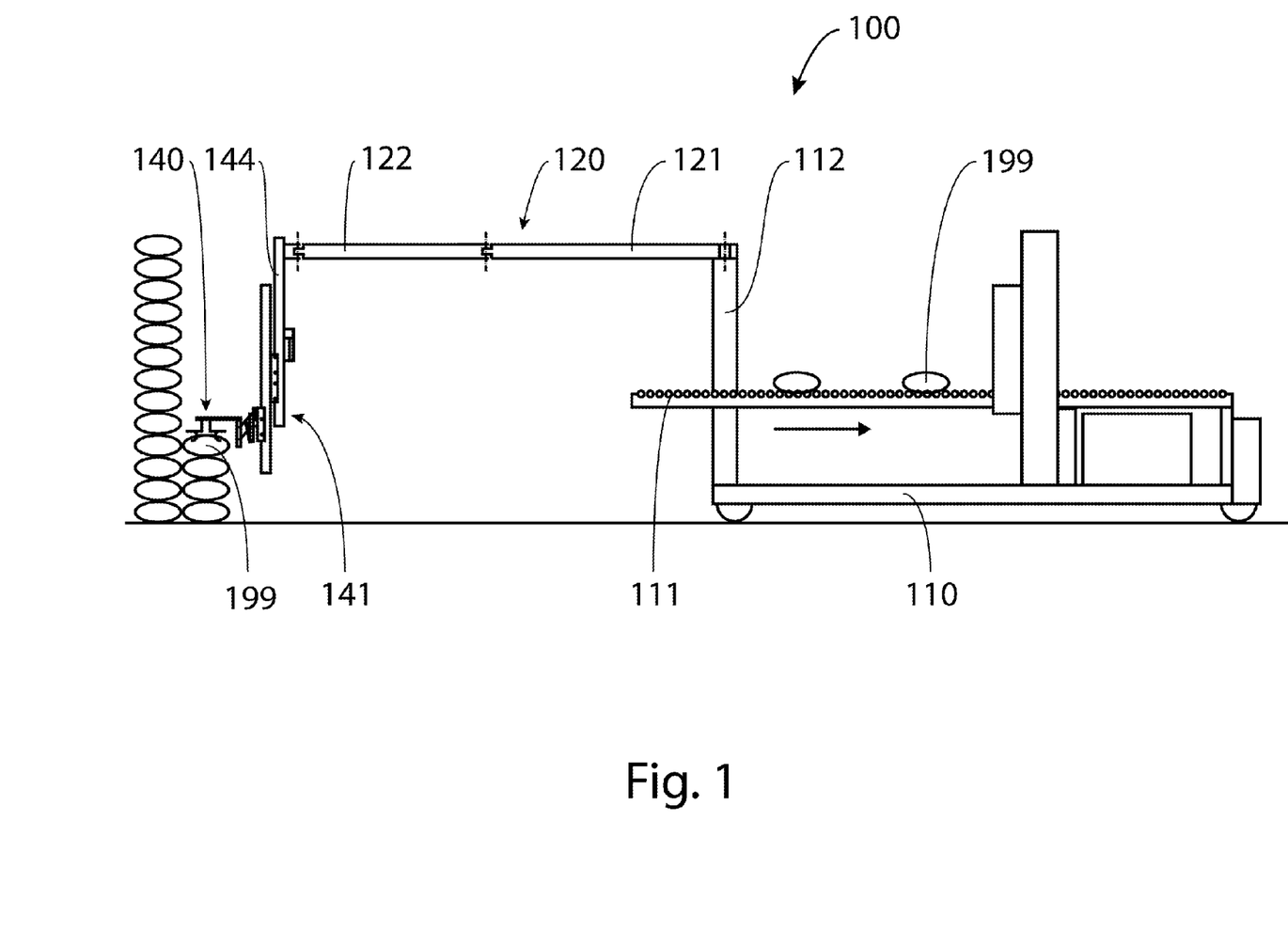
FIG. 1 shows a lateral view of an embodiment of an apparatus for loading and/or unloading stackable cargo units.

FIG. 1 depicts a lateral view of an apparatus 100 similar to the one disclosed in EP1885636, except that the apparatus 100 comprises a device 140 for picking up and holding a stackable cargo unit according to the present invention. The apparatus 100 comprises a frame 110, which is provided with a conveyor track 111, and an arm 120. The arm 120 comprises a first arm member 121, and a second arm member 122. The arm 120 is attached to the frame 110, by means of a post 112. The first arm member 121 is connected at a proximal end (seen from the post 112) to the post 112 such that it can rotate around a first upright axis. The second arm member 122 is connected with a proximal end to the distal end of the first arm member 121 such that it can rotate around a second upright axis.

Finally, the device 140 is connected to the distal end of the second arm member 122 in such a way that said device 140 can rotate around a third axis. The apparatus 100 comprises an assembly 141 of rodless cylinders 144 by which said device 140 can be moved up and down with respect to the second arm member 122. Said assembly 141 is provided with a hinging parallelogram construction, discussed with reference to FIG. 2, as result of which the device 140 can substantially remain in a horizontal, downward facing position and also come into contact with the upper side of a stackable cargo unit 199, in this case a bag 199.

Further aspects regarding the parts and operation of the apparatus is discussed in ample detail in EP1885636 and there is no need for more elucidation here.

Figure 2A:
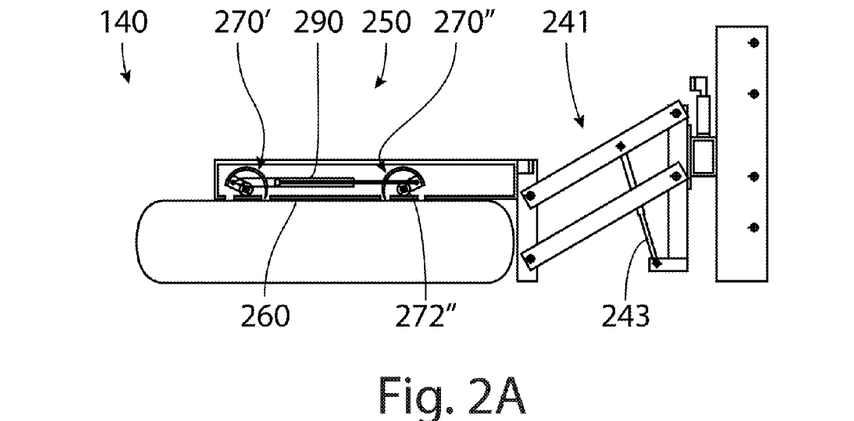
FIGS. 2A-2C show a side view of a device according to the invention with free ends of rotatable hooks in various positions.
Figure 2B:
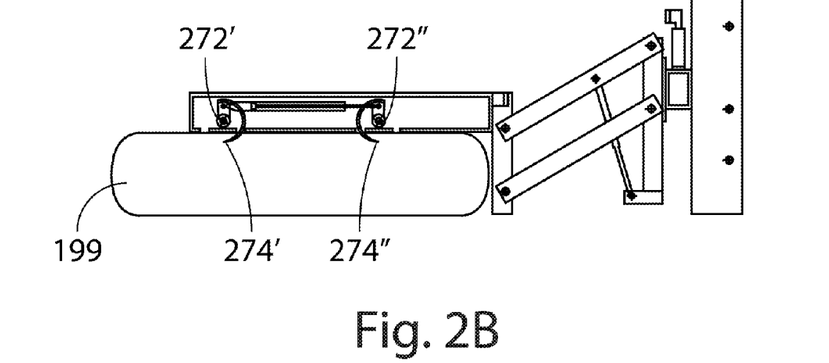
Figure 2C:
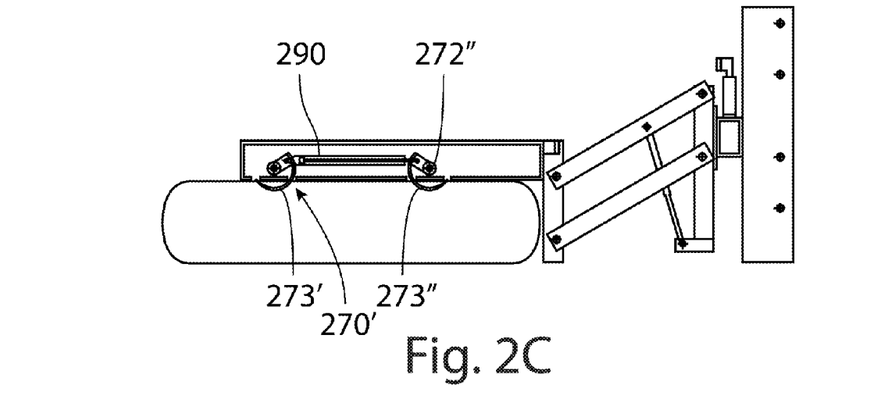

FIG. 2a, FIG. 2b and FIG. 2c depict a cross-sectional lateral view of an embodiment of the device 140 depicted in FIG. 1.

It comprises, as disclosed in EP1885636, a parallellogram construction 241 and a pneumatic cylinder 243, allowing for an upward movement which is in particular convenient if the topmost bag in a confined space such as a sea container is to be picked up or placed there.

The device 140 comprises a head 250 comprising a base 260 and piercing elements 270' and 270", here in this embodiment hooks 270' and 270". The hooks 270' and 270" are rotatably connected to the head 250 about respective axes 272' and 272" at proximal ends of hook bodies 273' and 273" with free ends 274' and 274" respectively. The bodies 273' and 273" are also connected to each other via an actuator 290, here a double-acting piston 290.

In FIG. 2a the free ends 274' and 274" are in a first position, wherein the free ends are pointing downwards and with a vector that defines the orientation of said free end having a first horizontal component smaller than a first vertical component of said first vector. In this embodiment, the device is designed such that the free ends 274' and 274" do not protrude from the base 260 (this feature will be explained later).

In FIG. 2b the free ends 274' and 274" are in a second position, wherein the vector that defines the orientation of the free end has a vertical component that is smaller than the horizontal component of said vector, the free end in said second position being lower relative to the base than the free end in the first position.

In FIG. 2c the free ends 274' and 274" are in a third position, wherein said free ends 274' and 274" are pointing upwards again.

By actuating the double-acting piston 290 the free ends 274' and 274" rotate about the axes 272' and 272" respectively in opposite directions such that each free ends 274' and 274" move along different trajectories, each trajectory comprising the first position, the second position and the third position, and wherein the second position is comprised along the trajectory between said first position and third position. The rotational movement provided to each free ends 274' and 274" by the double-acting piston 290 allows them to penetrate the wall of a bag 199, the load of which will be carried by the bodies 273 and 273".

For picking up a bag 199, the hooks 270' and 270" will be in the first position (FIG. 2a). The device 140 can be moved by the apparatus 100 such that the base 260 of the head is placed over the bag 199, e.g in contact with the top surface of said bag 199. The parallelogram construction 241 allows inaccurate placement of the head. In order to reduce the risk of hurting personnel or some object, the device 140 has been designed such that said free ends 274' and 274" do not protrude from the base 260 when they are in the first position.

Once the base 260 is on top of the bag 199, the hooks 270' and 270" are actuated again by the double-acting piston 290 such the free ends 274' and 274" rotates along the trajectory from said first position towards the second position (see FIG. 2b), the bodies 273' and 273" being introduced in the bag as well by the rotatory movement of the hooks 270' and 270".

When the free ends 274' and 274" are in the second position, the bag 199 is capable of being held by the device 140. However, in order to reduce the risk of dropping the bag 199 when the device 140 is moved from the first location to the second location, it is preferred that the free ends 274' and 274" rotate along the trajectory beyond said second position, preferably to the third position (see FIG. 2c) where each needle element penetrates the wall of the bag 199 twice.

The fact that the hooks 270' and 270" rotate about the axis 272' and 272" respectively in opposite directions improves the security during the picking up process if the wall of the bag 199 can deform easily, improving the reliability of the method.

The device 140 preferably comprises stops that prevent the free ends 274' and 274" respectively from going beyond their third position. This improves the reliability of the method. The stops may be the bottom of the base 260. If the hooks 270' and 270" encounter different resistances when penetrating the bag 199, the free ends 274' and 274" will rotate over different angles. If the piercing element that has rotated the furthest is stopped, all the force provided by the (freely hanging) double-acting piston is exerted to move the other piercing element. Thus it is ensured that said other piercing element penetrates the stackable cargo unit satisfactorily deep.

Figure 3A:
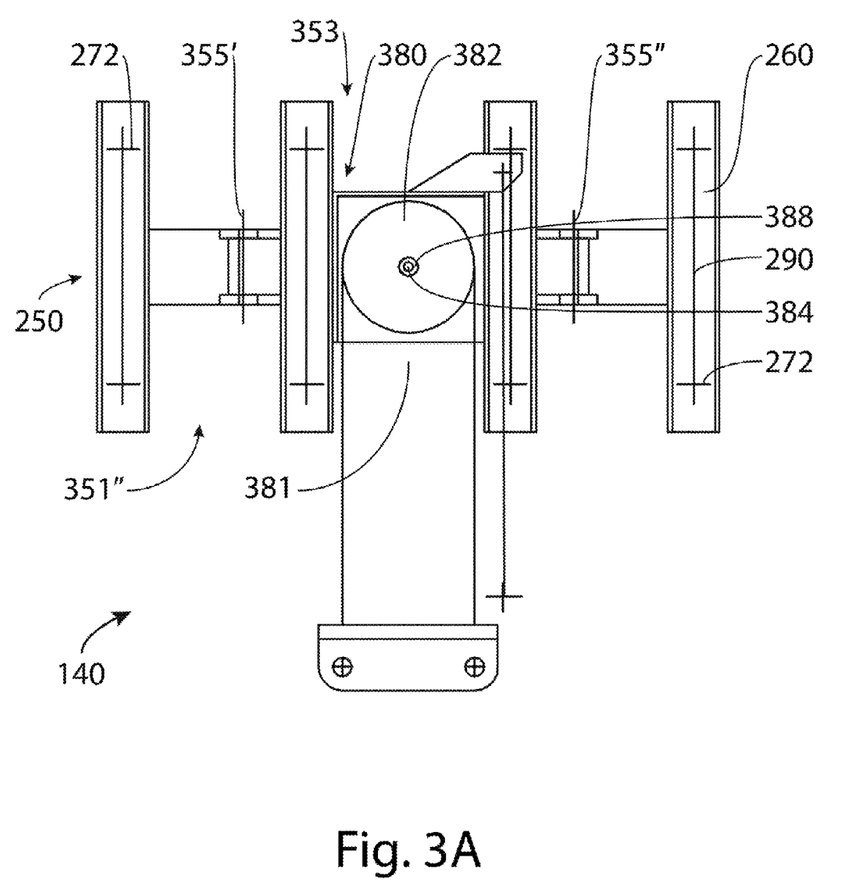
FIG. 3a shows a cross-sectional top view of a different embodiment of the device according to the invention, in particular a plate of a holding system.
Figure 3B:
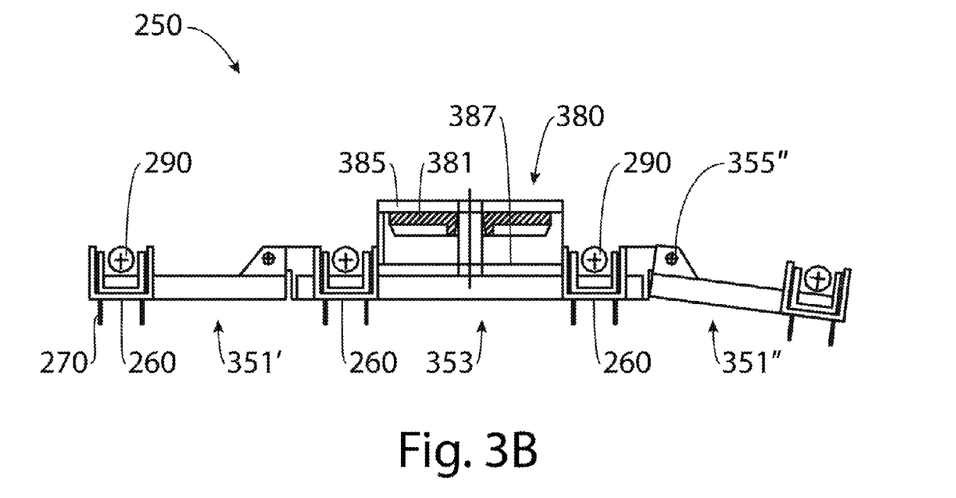
FIG. 3b shows a cross-sectional front view of the device shown in FIG. 3a, wherein the plate of the holding system is in a first state.
Figure 3C:
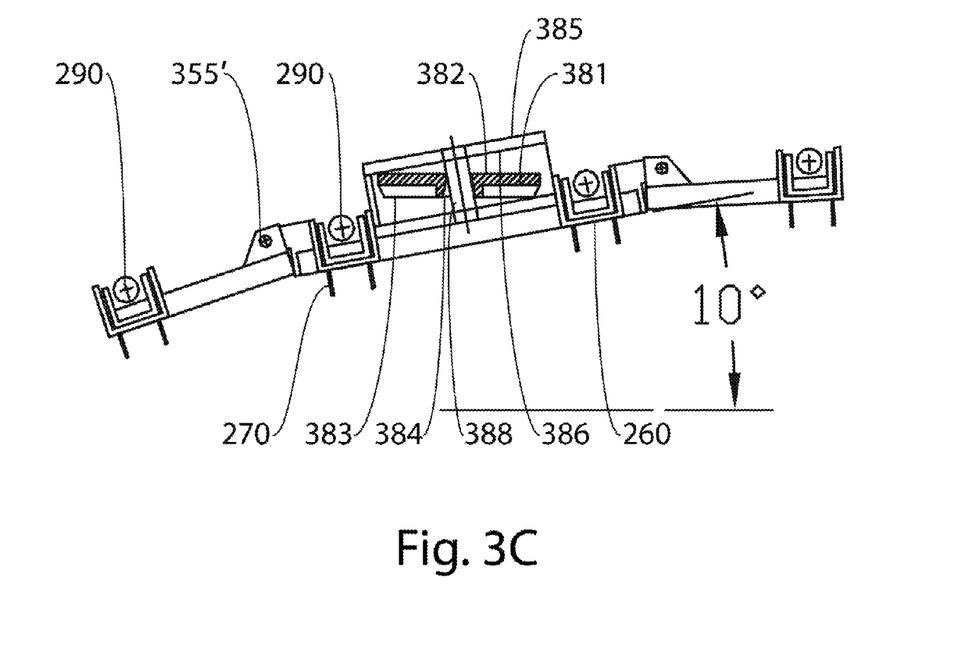
FIG. 3c shows a cross-sectional front view of the device shown in FIG. 3a, wherein the plate of the holding system is in a second state.

FIG. 3a depicts a cross-sectional top view of a different embodiment of the device 140 shown in FIG. 2, in particular a detail of a holding system 380 that allows for more lenience when placing the device over a bag 199. FIG. 3b and FIG. 3c depict a cross-sectional front view of the device 140 shown in FIG. 3a. The head 250 comprises a first side-section 351' and a second side-section 351", hingedly connected at opposite sides of a central section 353. In the embodiment shown, both side-sections comprise one base 260 and a set comprising two pairs of hooks 270' and 270" capable of being actuated by one double-acting piston 290 each. The central section 353 comprises two bases 260, each comprising a set of two pairs of hooks capable of being actuated by a double-acting piston 290. The relationship of the hooks 270' and 270" with respect to their corresponding base 260 at each section of the head 250 is the same shown in FIG. 2, and, therefore, for the sake of clarity, these features will not be explained again.

In the embodiment shown in FIG. 3a, the head 250 comprises a holding system 380 comprising a plate 381 and a cage 385. The plate 381 is, for example, connected to the movable arm 120 of the apparatus 100. The plate 381 comprises a first outer face 382 and a second outer face 383. The cage 385 is connected to the central section 353, e.g. an integral part thereof.

The plate 381 is held by the cage 385 by a pin 388 and an opening 384 through the plate 381. In the present embodiment the pin 388 connects the first inner face 386 with the second inner face 387 of the cage 385, while the plate 381 comprises the opening 384 through which said pin 388 is guided to allow a relative guided movement of the plate 381 with respect to the cage 385 and hence of the head 250. Since the plate 381 is connected to the movable arm 120 and the cage 385 is connected to the head 250, said head 250, and thus the base 260, can move in a vertical direction with respect to said arm 120 when the device 140 is placed on top of the bag 199.

The guided movement is possible between a first state (shown in FIG. 3c) wherein the head 250 of the device 140 has been placed on top of the bag 199 and thus is being supported by said bag 199 and a second state (shown in FIG. 3b) wherein the head 250 is no longer supported by said bag 199. In this embodiment the slidably movement of the plate 381 within the cage 385 is stopped in the first state by a contact between the first inner face 386 of the cage 385 and the first outer face 382 of the plate 381. In the second state the guided movement of said plate 381 is stopped by a full contact between the second inner face 387 and the second outer face 383. Thus, thanks to the holding system 380 which can be used as an alternative to or in addition to the parallelogram construction 241, there is no need to accurately estimate the distance between the base 260 of the device 140 and the bag 199 when approaching it to the top surface of said bag 199. Hence, the picking-up process can be quicker.

In the present embodiment, the opening 384 is oversized with respect to the pin 388, allowing the plate 381 to tilt with respect to the first inner face 386 and the second inner face 387 of the cage 385 while said pin 388 slides between the first state and the second state. Thus, the base 260 can also tilt when placed on top of the bag 199, so the base 260 and the hooks 270' and 270" are in a better orientation with respect to the surface of said bag 199, improving the reliability of the device 140.

To facilitate tiling of the head 250 with respect to the plate 381 in response to contact with the bag 199, the first outer face 382 of the plate 381 comprises a round top section of the plate 381, said top section defining the first outer face 382, which is for preferably circular. Thus, the tilting of the head 250 and thus of the bases 260 of the device 140 can be achieved in a wide range of directions. In the example, the holding system 380 has been designed such that the maximal tilting with respect to the first outer face 382 is 10°.

The first side-section 351' and the second side-section 351" are hingedly connected to the central section 353 of the head 250 such that said first side-section 351' is capable of hinging about an axis 355' an angle α with respect to the longitudinal axis of the central section 353, and the second side-section 351" an angle α' about an axis 355". When the head 250 of the device 140 is placed on top of the bag 199, the side-sections can hinge depending on the top surface of said bag 199, which improves the reliability of the device 140 since the base 260 and the set of hooks of said side-sections are in a better orientation with respect to said top surface. The downward hinged movement of the side-sections are stopped by the central section 353 serving as a stop. The size of each section and the angle α and α' (e.g. 10°) can be decided depending on the size and shape of the bag 199.

Figure 4A:
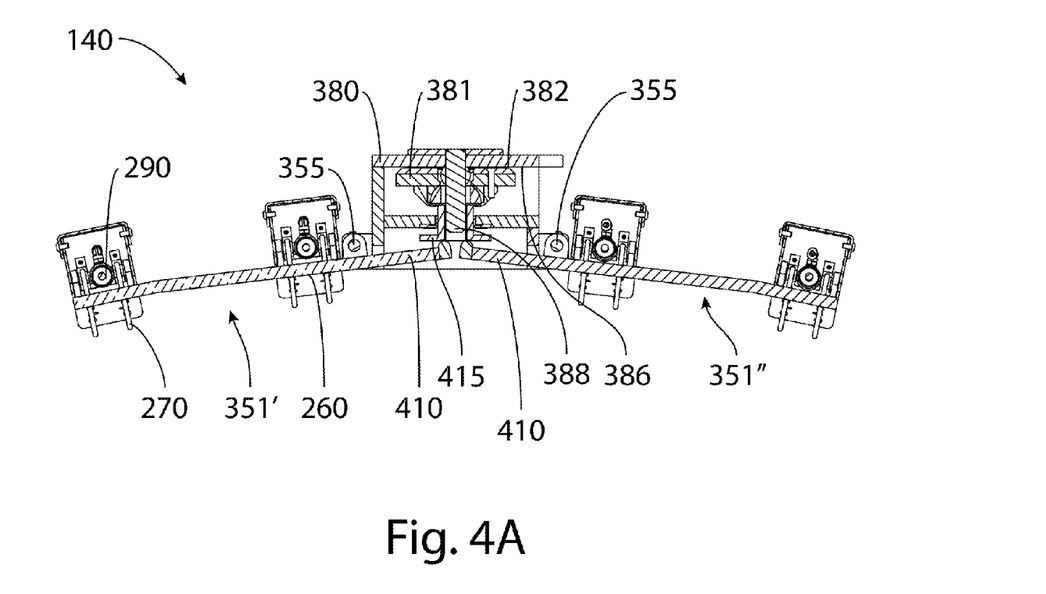
FIG. 4a and FIG. 4b show a schematic cross-sectional view of an alternative embodiment of a device.
Figure 4B:
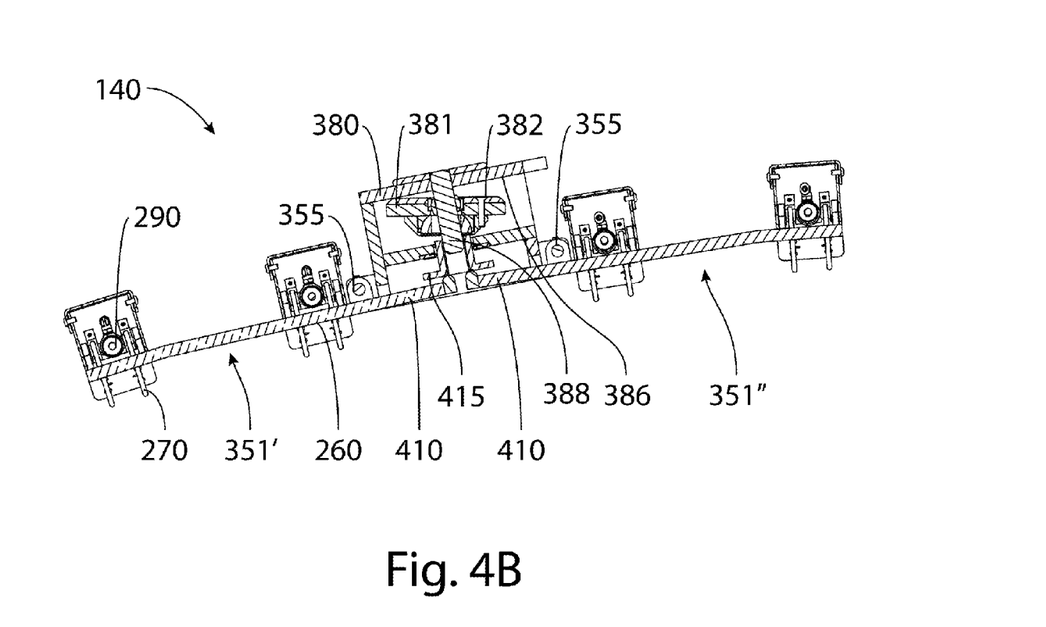

FIG. 4a and FIG. 4b show a cross-sectional frontal view corresponding to FIG. 3b and FIG. 3c of an alternative embodiment of the device 140, which allows for tilting of the head 250. In this embodiment however, the side-sections 351', 351" have arms 410 that act as a lever that push against a flanged sleeve 415 guided by pin 388. Should, due to an uneven weight distribution of a bag lifted by the device 140, the head 250 tilt (as shown in FIG. 4B), the levers 410 will push against the flanged sleeve 415, and push it upwards, pressing the plate 381 with its first outer face 382 against the first inner face 386 of the cage 385. Thus, the head 250 rights itself (FIG. 4a). This is beneficial if the bag 199 is to be positioned at the second location accurately. The lever arms 410 could push against the plate 381 directly.

The invention claimed is:

1. A method for moving a stackable cargo unit from a first location to a second location using a device for picking up and holding the stackable cargo unit, said device comprising a head, the head comprising
   an actuator;
   a base for being placed over the stackable cargo unit; and
   a piercing element, wherein the piercing element is rotatable about an axis that is transverse to vertical when the device picks up and holds the stackable cargo unit, wherein said piercing element comprises
      a body for holding the stackable cargo unit, the body connected to the actuator; and
      a free end for piercing the stackable cargo unit, the free end connected to the body and capable of being moved by said actuator along a trajectory relative to the base, said trajectory comprising a first position a second position and a third position, wherein
         in the first position the free end of the piercing element faces downward, with a vector that defines the orientation of the free end having a first horizontal component smaller than a first vertical component of said first vector;

in the second position the vector that defines the orientation of the free end has a vertical component that is smaller than the horizontal component of said vector, the free end in said second position being lower relative to the base than the free end in the first position; and in the third position the free end of the piercing element is pointing upwards when the device picks up and holds the stackable cargo unit, wherein the second position is between the first position and the third position;

and wherein the method comprising the steps of i) picking up the stackable cargo unit at its top surface with the device at the first location;

ii) moving the device from said first location towards the second location while holding the stackable cargo unit with the device; and iii) releasing the stackable cargo unit from the device;

characterized in that the head comprises a first section and a second section, the first section and the second section hingedly connected and each section comprising a piercing element, and an actuator for actuating said piercing element;

and wherein picking up the stackable cargo unit with the device comprises the steps of i) placing the base of said device over the surface of the stackable cargo unit and ii) moving the free end of the piercing element by the actuator along the trajectory in a direction from the first position towards the second position;

holding the stackable cargo unit is achieved by having the free end in a position away from the first position; and releasing said stackable cargo unit from the device comprises the step of moving said free end by the actuator along the trajectory in a direction from the second position towards the first position.

2. A device for picking up and holding a stackable cargo unit, wherein the device comprises a head, the head comprising an actuator;

a base for being placed over the stackable cargo unit; and a piercing element, wherein the piercing element is rotatable about an axis that is transverse to vertical when the device picks up and holds the stackable cargo unit, wherein said piercing element comprises a body for holding the stackable cargo unit, the body connected to the actuator; and a free end for piercing the stackable cargo unit, the free end connected to the body and capable of being moved by said actuator along a trajectory relative to the base, said trajectory comprising a first position, a second position and a third position, wherein in the first position the free end of the piercing element faces downward, with a vector that defines the orientation of the free end having a first horizontal component smaller than a first vertical component of said first vector;

in the second position the vector that defines the orientation of the free end has a vertical component that is smaller than the horizontal component of said vector, the free end in said second position being lower relative to the base than the free end in the first position; and in the third position the free end of the piercing element is pointing upwards when the device picks up and holds the stackable cargo unit, wherein the second position is between the first position and the third position;

characterized in that the head comprises a first section and a second section, the first section and the second section hingedly connected and each section comprising a piercing element, and an actuator for actuating said piercing element.

3. The device according to claim 2, wherein the piercing element is a first piercing element that comprises a first free end and the device comprises a second piercing element that comprises a second free end, both the first piercing element and the second piercing element being operably connected to the same actuator.

4. The device according to claim 3, wherein in the second position, the direction of the horizontal component of the first free end is opposite to the direction of the horizontal component of the second free end.

5. The device according to claim 3, wherein the base comprises a first stop for preventing the first free end from being moved beyond the third position of the first piercing element and a second stop for preventing the second free end from being moved beyond the third position of the second piercing element.

6. The device according to claim 2, wherein the piercing element is a hook.

7. An apparatus for moving a stackable cargo unit from a first location to a second location wherein the apparatus comprises a movable arm comprising a distal end, said distal end connected to a device for picking up and holding the stackable cargo unit, characterized in that the device correspond to a device according to claim 2.

8. A device for picking up and holding a stackable cargo unit, wherein the device comprises a head, the head comprising an actuator;

a base for being placed over the stackable cargo unit; and a piercing element, wherein said piercing element comprises a body for holding the stackable cargo unit, the body connected to the actuator; and a free end for piercing the stackable cargo unit, the free end connected to the body and capable of being moved by said actuator along a trajectory relative to the base, said trajectory comprising a first position and a second position, wherein in the first position the free end of the piercing element faces downward, with a vector that defines the orientation of the free end having a first horizontal component smaller than a first vertical component of said first vector; and in the second position the vector that defines the orientation of the free end has a vertical component that is smaller than the horizontal component of said vector, the free end in said second position being lower relative to the base than the free end in the first position;

characterized in that the head comprises a first section and a second section, the first section and the second section hingedly connected and each section comprising a piercing element, and an actuator for actuating said piercing element;

wherein the device comprises a plate, said plate comprising a first outer face; and a second outer face i) opposite to the first outer face, and ii) facing away said first outer face;

and
    a holding system for holding at least part of the plate, said holding system comprising a cage comprising
        a first inner face; and
        a second inner face that i) is opposite to the first inner face, and ii) faces said first inner face;
wherein the cage and the plate can move relative to each other using
i) a pin, and
ii) an opening for the pin;
with the at least part of the plate between the first inner face and the second inner face of the cage, such that the first outer face of the plate faces said first inner face, and the second outer face of the plate faces said second inner face.

9. The device according to claim 8, wherein the piercing element is rotatable about an axis that is transverse to the vertical when the device picks up and holds the stackable cargo unit.

10. The device according to claim 9, wherein the free end is capable of being moved along the trajectory relative to the base to a third position, wherein the second position is between the first position and the third position, and in said third position the free end of the piercing element is pointing upwards when the device picks up and holds the stackable cargo unit.

11. The device according to claim 8, wherein the cage is connected to the base of the head, said cage comprising the pin, and the plate comprises the opening for the pin to act as a guide.

12. The device according to claim 8, wherein the opening is oversized with respect to the pin.

13. The device according to claim 12, wherein the plate comprises a protruding top plate section, the protruding top plate section comprising the first outer face facing the first inner face of the cage.

14. The device according to claim 13, wherein the protruding top plate section has a round shape.

15. The device according to claim 8, wherein the head comprises a first section and a second section, the first section and the second section hingedly connected to the cage and each section comprising
    a piercing element,
    an actuator for actuating said piercing element, and
    a lever arm capable of exerting an upward force on the plate.

\* \* \* \* \*